United States Patent [19]
Mullin

[11] Patent Number: 5,385,472
[45] Date of Patent: Jan. 31, 1995

[54] CONSTRUCTION WATER TOY

[76] Inventor: Keith A. Mullin, 2797 Northbrook Pl., Boulder, Colo. 80304

[21] Appl. No.: 96,378

[22] Filed: Jul. 26, 1993

[51] Int. Cl.⁶ .............................................. G09B 23/12
[52] U.S. Cl. .................................. 434/126; 446/166; 446/153; 446/89
[58] Field of Search .................. 434/126; 446/89, 166, 446/168, 176, 177, 217, 218, 153

[56] References Cited

U.S. PATENT DOCUMENTS

| | | | |
|---|---|---|---|
| 1,896,607 | 2/1933 | Brunner | 446/177 X |
| 2,861,388 | 11/1958 | Favaretto | |
| 3,002,315 | 10/1961 | Kuhn | |
| 3,205,611 | 9/1965 | Onanian | |
| 4,057,244 | 11/1977 | Gaspar | 446/166 X |
| 4,080,752 | 3/1978 | Burge | 446/89 |
| 4,619,625 | 10/1986 | Seki et al. | 446/89 |
| 5,078,642 | 1/1992 | Glessner | 446/153 |

FOREIGN PATENT DOCUMENTS 2048088 12/1980 United Kingdom .................. 446/89

OTHER PUBLICATIONS

Kenner's "Hydro-Dynamic Building Set No. 11" Advertisement in Playthings, Jul. 1964.

*Primary Examiner*—Gene Mancene
*Assistant Examiner*—Jeffrey A. Smith
*Attorney, Agent, or Firm*—Brown, Martin, Haller & McClain

[57] ABSTRACT

A educational water toy designed for mounting on a vertical surface, such as a bathtub wall, is disclosed. It consists of a variety of interlocking parts which can be arranged in various sequences. The various parts are designed to conduct water; control, or respond to, water flow; or to attach other parts to the vertical surface. The fluid-conveying and -operated toy has a reservoir, at least one activity component, a fluid conduit which provides fluid communication between the reservoir and the activity component, with the activity component being placed into motion by fluid exiting from the conduit, coupling structures interconnect the components in fluid communication, and attaching devices for removably attaching the components to the vertical surface in an orientation such that the fluid flows along the fluid flow path under the force of gravity. The various activity components may include a paddle wheel, a turbine, an hourglass member, a dipper, a sprayer and a squirter. Preferably the toy will also include a regulator, such as a stopcock, to control the rate of flow of the fluid through the conduit. The various components can be assembled into a myriad of different configurations. Preferably all of the components will be brightly colored and formed of transparent material so that their operation can be observed. They may also be formed into abstract, whimsical or otherwise amusing shapes to enhance the entertainment value of the toy.

17 Claims, 12 Drawing Sheets

CONSTRUCTION WATER TOY

BACKGROUND OF THE INVENTION

1. Field of the Invention

This invention relates to construction and water toys. More particularly it relates to water toys which are intended to be mounted on generally vertical surfaces.

2. Prior Art

Most children love to play with water; they also become engrossed with building things. This toy combines both construction and water play. Interconnected construction toys have been widely described in the past; relevant examples include U.S. Pat. No. 2,861,388 ("Structural Toy and Model Building Set"), describing a basic construction toy whose elements are connected together by means of projections on and sockets in the elements; U.S. Pat. No. 3,205,611 ("Hollow Blocks and Tubular Connecting Means Therefor"), describing a construction toy which allows fluid to pass through its assembled parts, but which utilizes unwieldy structures held together with rubber bands; and U.S. Pat. No. 4,080,752 ("Toy Blocks with Conduits and Fluid Seal Means") describing a toy whose components may be connected together in fluid-tight connections but which requires a base assembly to support those components.

No construction toy is known, however, which is specifically designed to be constructed and mounted on generally vertical surfaces. Such would permit the toy to be played with in the bathtub, in a pool or anywhere there is a suitable mounting surface.

SUMMARY OF THE INVENTION

This educational toy is designed for mounting on a vertical surface. It consists of a variety of interlocking parts which can be arranged in various sequences. It provides children with opportunities to explore and manipulate arrangements of parts, and also to experiment with the principles of fluid dynamics and energy conversion (such as from gravity to mechanical energy). Many of the parts are designed to conduct water; other parts control, or respond to, water flow; additional parts enable the child to attach various parts to the vertical surface by means of suction cups. All of the parts are large enough to avoid loss through a bathtub drain.

This toy set provides children with a variety of ways to assemble parts which interact with water; thus the toy is suitable for a wide range of ages. As the child grows older, he/she is able to devise more complex designs.

In addition to being a construction toy, this toy also enables children to understand properties of water flow and energy conversion.

In its broadest form, the invention herein is a fluid-conveying and -operated toy comprising a fluid reservoir having an inlet and an outlet; at least one activity member disposed adjacent to the outlet of the fluid conduit member and which is placed into motion by being contacted with flowing fluid; at least one elongated fluid conduit member having an inlet and an outlet and which provides fluid communication for the flowing fluid from the reservoir to the activity member; coupling means for connecting the inlet of the conduit member to the outlet of the reservoir to provide a fluid flow path for the fluid communication from the reservoir to the activity member; and attaching means for removably attaching the reservoir, conduit member and activity member to a generally vertical surface in an orientation such that the fluid flows along the fluid flow path under the force of gravity.

The various activity components may include a paddle wheel, a turbine, an hourglass member, a dipper, a sprayer and a squirter. Preferably the toy will also include a regulator, such as a stopcock, to control the rate of flow of the fluid through the conduit. The reservoir may be manually filed or demand filled.

The various components can be assembled into a myriad of different configurations, and not all of the components need to be used in each configuration. While one can use the toy in its basic form, it can, and normally will, be expanded to a much larger assembly, including branching flow paths, stopcocks to control flow in the various paths, and numerous activity members.

Preferably all of the various conduits and activity components, and usually also the reservoir, will be formed of transparent material so that their operation can be observed. It is also preferred to have the various components brightly colored to attract a child's attention. Typically the toy will be constructed of molded plastic.

DETAILED DESCRIPTION

Figure 1:
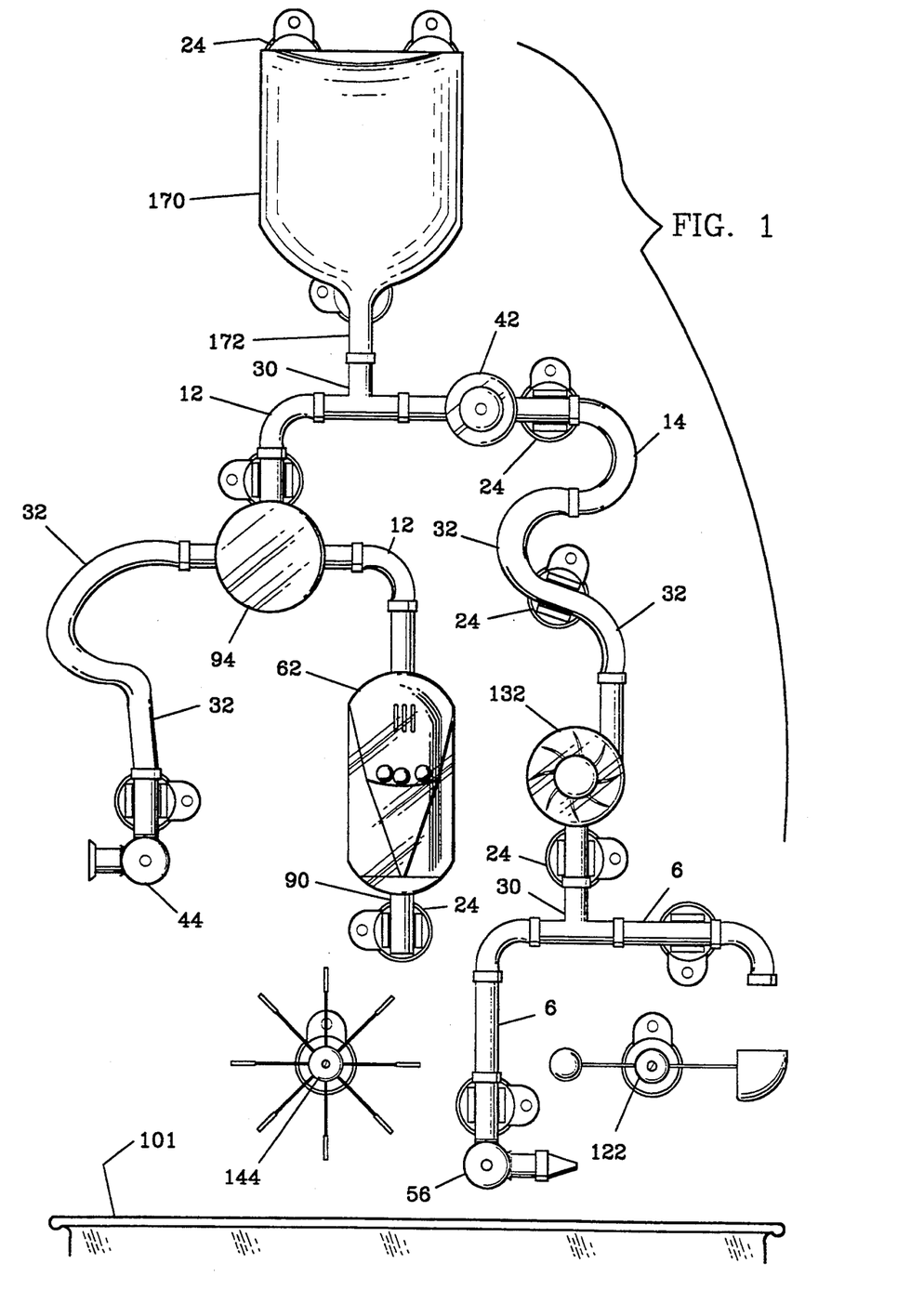
FIG. 1 is an elevation view of one embodiment of assembled pieces of the invention as they would appear when mounted on a vertical surface, in this case exemplified by a bathtub wall.
Figure 24:
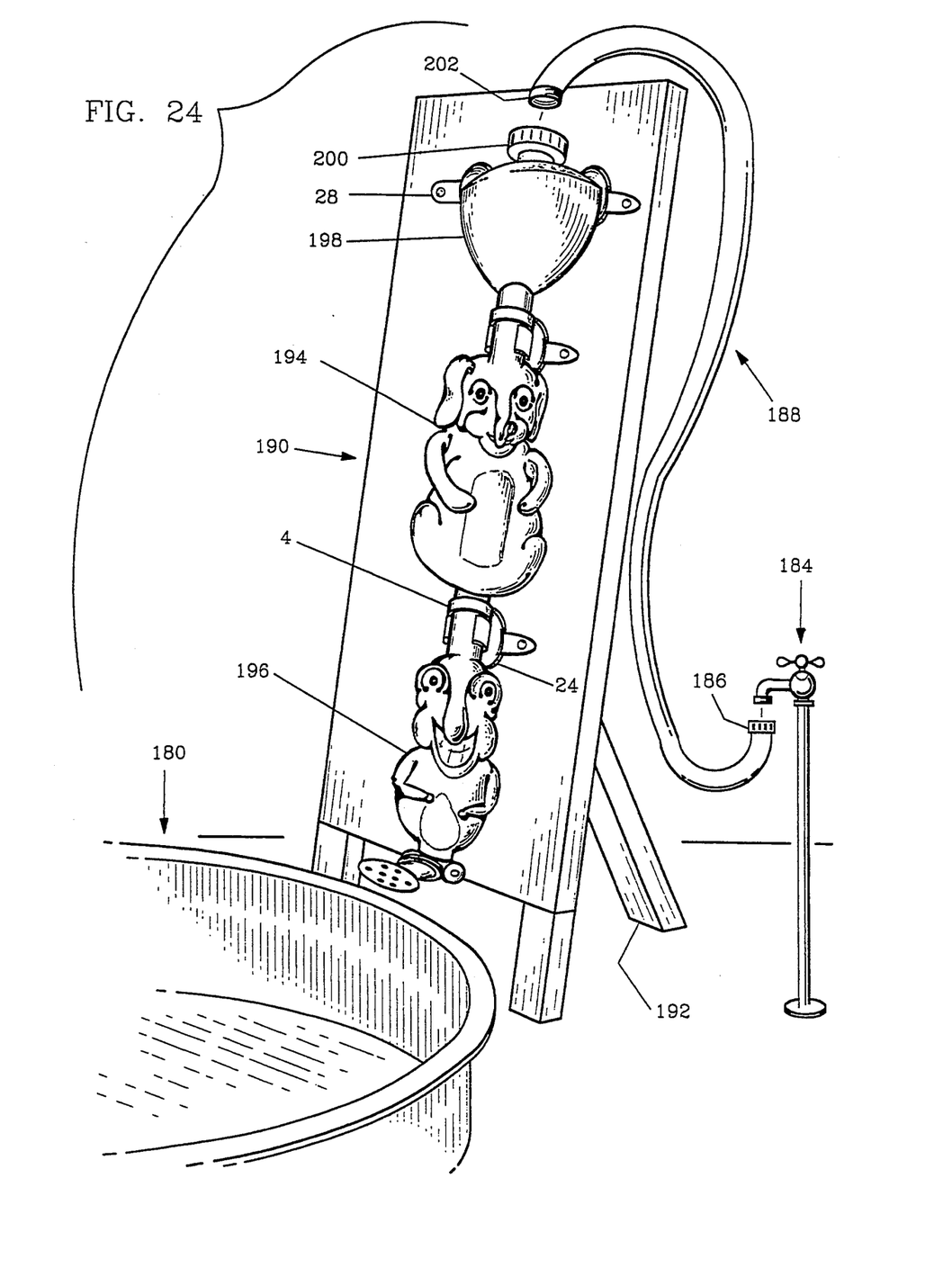
FIG. 24 is a view similar to that of FIG. 1, showing a different embodiment of the toy mounted on a free-standing generally vertical surface, and illustrating an alternative means of providing water to the toy.

The invention is best understood by reference to the drawings. FIGS. 1 and 24 illustrate typical arrangements of the many embodiments which can be constructed with this toy. Each of the individual components and their operation will be separately described below, but their overall relationship can be identified from FIGS. 1 and 24. The entire assembly is attached to a generally vertical surface, exemplified by a bathtub wall 21 in FIGS. 7 and 19 and by a free-standing panel 190 in FIG. 24. It will be seen from FIG. 24 that the surface need not be exactly vertical. Preferably, however, the surface will be essentially vertical (as with a bathtub wall) or not more than about 20° from vertical, since as the angle from vertical increases, the water flow diminishes and the mechanical actions of the various components either diminish or cease entirely, thus eliminating the entertainment and play value of the toy. Typical of surfaces which could be used in place of bathtub wall 21 are a simple panel (as shown at 190), a garage door, an outside wall of a house and a fence. For brevity herein, however, the term "vertical" will be used to include both actual and generally vertical orientations.

The toy is preferably mounted over a bathtub (the top edge of which is shown schematically in FIG. 1 at 101) or other receptacle such as wading pool 180 in which the child can stand or sit while playing with the toy. As will be described below, this receptacle also serves as a catch basin and reservoir for a water supply for the toy. However, where there is an alternative water supply, as shown in FIG. 24 with water pipe and faucet 184 to which hose 188 is attached by coupling 186, then the pool 180 can be dispensed with and the toy used with the vertical surface alone. For the purposes of description herein, it will be assumed that the toy is being used over a receptacle, which will be exemplified by a bathtub.

The components of the toy are held to the vertical surface by appropriate means, in this case exemplified by suction cups 24. At the highest point is reservoir 170, into which water will be placed. The water supply may be intermittent, as by scooping water from the bathtub using scoop 150 (FIG. 20) or by occasional manual filling from hose 188 (FIG. 24) or from a tube attached to a tub or sink faucet (not shown), or continuous, as by allowing hose 188 to run steadily. It will also be understood that means can be provided, such as a pneumatic, hydraulic or electric pump, to recycle water from the catch basin or supply water from some other source to the reservoir. The water supply means may also include an "automatic" or "demand" capability (FIG. 25), by proving a supply conduit 252 from a water supply (not show) to the reservoir 170 with a controllable valve $V_I$. As the water level 254 in the reservoir 170 rises and falls, the level is sensed by a float 256 which is operably hinged to a sensor 258. The sensor 258 converts the level indication from float 256 into an electrical signal which is transmitted to controller 260 through wires 262. Controller 260 in turn drives valve motor 266 which opens and closes valve $V_I$, which in turn controls the input of water to reservoir 170 through conduit 252. Power to drive controller 260 and sensor 258 may be internal (e.g., batteries) or external (through wires 264 to an external power source such as household electrical lines or to an alternative power source such as solar panels). Controller 260 will normally have upper and lower set points related to the varying water level 254 in reservoir 170, to determine when valve $V_I$ will be opened or closed. Such types of controllers and control valves are conventional. The flow of water out of reservoir 170 will normally be through conduit 268 which includes valve $V_O$. Valve $V_O$ is preferably a manually controlled valve, having control stem wheel 270. The user of the toy will open valve $V_O$ by the desired amount to allow water to flow into the toy at the desired rate. This in turn will activate float 256 and the demand or feedback system controlling valve $V_I$ to replenish the water supply in reservoir 170 as needed. (Of course, appropriate safety features will also be incorporated, particularly if the pump, valve or other device is electrically operated or operates at high water pressure, to avoid injury to the toy's user.) Those skilled in the art will recognize a wide variety of conventional structures to provide and/or control water flow to the reservoir, which need not be further described herein.

The water flows out of the reservoir 170 through outlet 172 and into tee 30, where the flow divides. One stream flows through 90° elbow 12 into beaker 94, in which the stream is further divided, with one portion passing through a second 90° elbow 12 and into hour glass 62, from which it is ejected through outlet 90 to contact and activate paddle wheel 144. The other portion passes through flexible tube 32 into sprayer 44, from which it is emitted as a water spray.

The other stream leaving tee 30 passes through stopcock 42, which can be used to block the water flow or to regulate the flow rate. The water continues through U-tube 14 and another flexible conduit 32 to turbine 132 and on through another tee 30, where it is again divided. One portion passes to straight conduit 6 and then drains through another elbow 12 to contact and activate dipper 122. The other portion passes through an elbow 12 and straight conduit 6 to a squirter 56, from which it is emitted in a steady stream.

After passage through the various conduits and operating members, the water drains back into the bathtub 101, from which it can again be scooped up and replaced in the reservoir, so that the child can enjoy playing with the toy for a prolonged time where a hose is used, the water flow can be continuous or intermittent.

It will be evident that the various components can de assembled into a myriad of different configurations, and that not all of the components need to be used in each configuration. The basic toy, as noted, must include a reservoir at the highest elevation to collect and dispense the water initially, at least one activity member, a conduit to provide fluid communication between the two, and means to attach the components to a vertical surface. It can, and of course often will, be expanded to a much larger assembly, including branching flow paths, stopcocks to control flow in the various paths, and numerous activity members. All of the various configurations are to be considered to be within the scope of this invention.

The toy may be constructed of any convenient water insoluble material. Such material may be metal, glass, or rubber. Most preferred, however, will be molded plastic, particular a transparent plastic, so that water movement can be viewed. Preferred is to have the various components be of different and bright colors to attract and retain the child's attention. Ideally each of the major categories of components will be a different color, to aid the child's recognition of the various parts and their functions. All of the parts should be appropriately large, so as not to be able to pass into the tub drain and thus become lost or block the drain or plumbing. Similarly, large size pieces enhance the toy's use outdoors, since the large pieces are not easily lost in grass or stepped on by children.

The toy may be mounted to the vertical surface in any convenient, removable manner, including (but not limited to) suction cups, hook-and-loop fasteners (such as "Velcro TM" fasteners), hooks and hangers.

Figure 2:
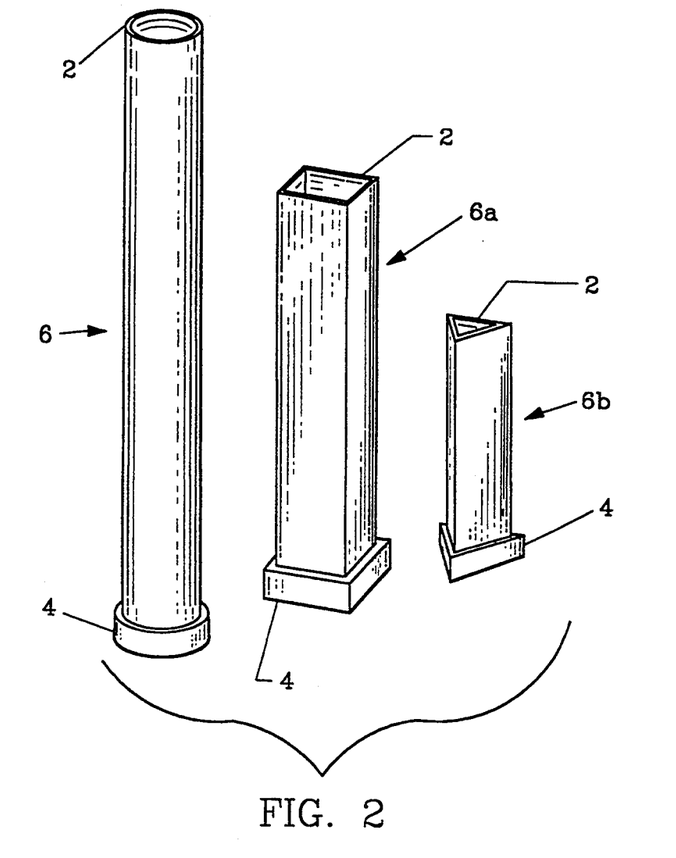
FIG. 2 is a perspective view of typical tubular conduit members.
Figure 23:
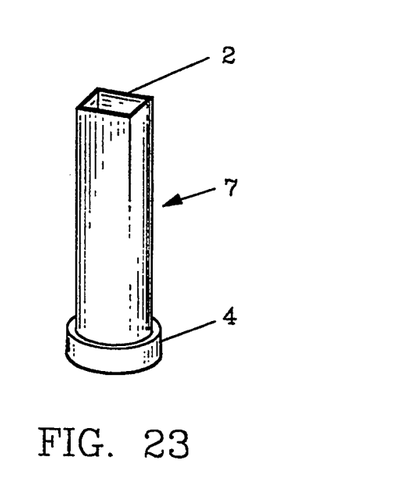
FIG. 23 is a perspective view of a transition member to permit coupling of members of different cross-sectional shapes.

Considering now the various components, FIG. 2 illustrates three typical lengths and cross-sectional shapes of straight tubular conduits: a long circular conduit 6, a medium length square conduit 6a, and a short triangular conduit 6b, each with a male end 2 and a female end 4, so that they (and the other components) can be interconnected. It will be understood that there may be other cross-sectional shapes such as elliptical, and that the differently shaped conduits can be joined by appropriate transitional couplers 7 such as shown in FIG. 23. The transitional coupler 7 illustrated provides for coupling a male end of a circular conduit to the female end of a square conduit. Other transitions, such as square-to-triangle or triangle-to-ellipse, and male-to-male or female-to-female conduit ends, will be evident. Also of course any cross-sectional shape may be used with any length conduit.

Figure 3:
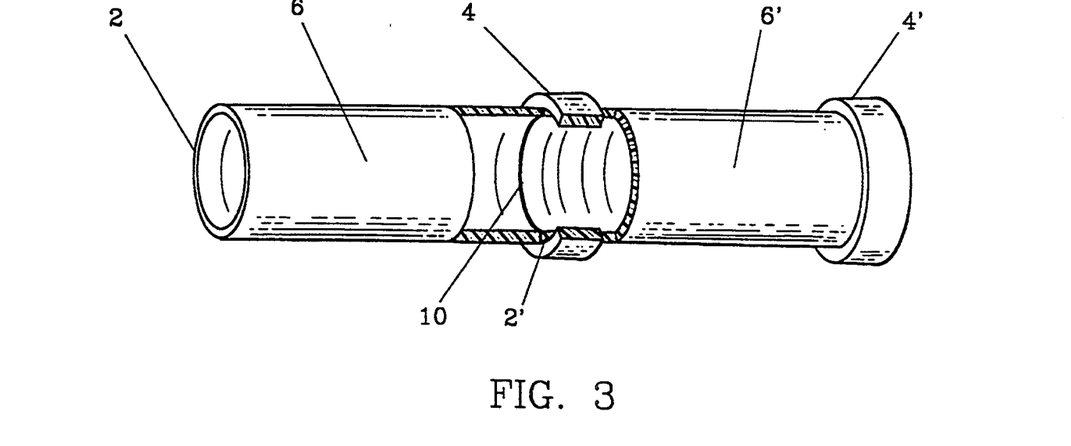
FIG. 3 is a horizontal oblique view of a two coupled tubular conduit members, partially cut away to show the manner of male/female connection.

The manner of joining the components is shown in FIG. 3, wherein two conduits labelled 6 and 6' are shown joined at 10. The male end 2' of conduit 6' fits into the female end 4 of conduit 6 with a slight interference fit. The fit must be sufficiently tight to maintain the two components in the coupled position against the flow of the water and the pull of their own weight, but not so tight that a reasonable adept child (and certainly an adult) cannot join or separate the components easily to assemble, change or dismantle any configuration. The abutting ends should be sufficiently smooth and parallel that there is little or no water leakage at the joint 10.

Figure 4:
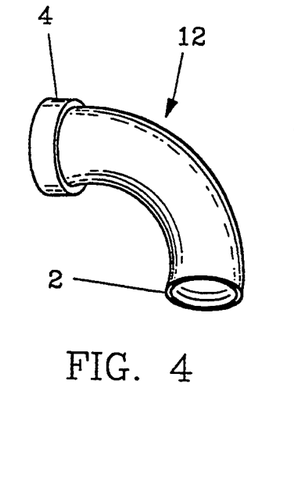
FIG. 4 is a side elevation view of an elbow-curved tube.
Figure 5:
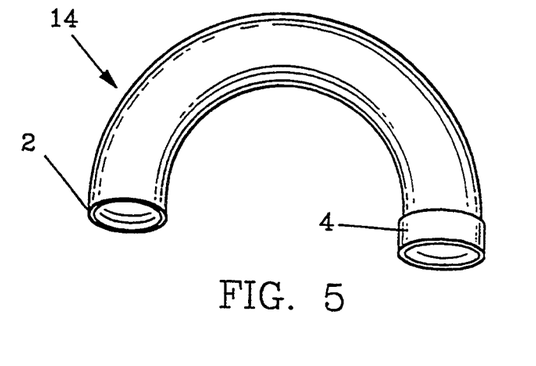
FIG. 5 is a side elevation view of a U-shaped tube.

There are two principal types of curved conduits: a 90° curved elbow tube 12 (FIG. 4) and an 180° curved U-tube 14 (FIG. 5). Each also has a male end 2 and a female end 4 to permit interconnection with the other components. It will be understood that conduits of any other desired degree of curvature, such as 45°, may also be used.

Figures 8, 9:
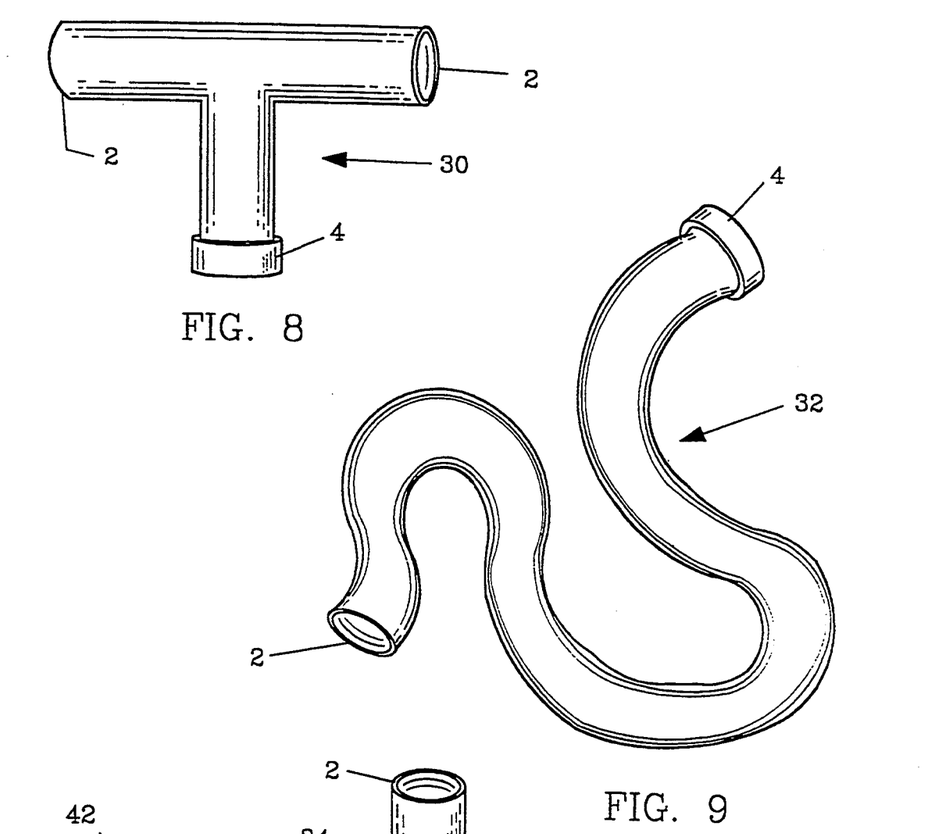
FIG. 8 is a horizontal oblique view of a tee with two male ends and one female end.
FIG. 9 is a perspective view of a long flexible tubular conduit.

Another type of conduit useful in this toy is the flexible conduit 32 shown in FIG. 9. This type of conduit may be of any convenient length, and allows for freeform configurations of the assembled toy.

FIG. 8 illustrates a means of dividing the flow stream. The component illustrated is a hollow tee 30, in which water may enter any of the arms and exit through any of the others. Male 2 and female 4 coupling elements are present. Commonly the toy set will contain a variety of different tees, with the male and female ends in different combinations so that various orientations of mating components can be accommodated. Other similar branching components, such as wyes or manifolds, can also be present.

Figure 6:
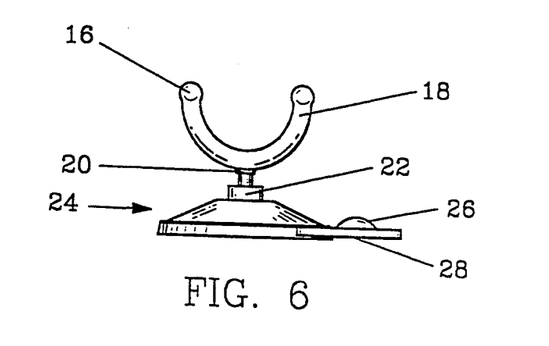
FIG. 6 is a side elevation view of a suction cup, clip, and handle.
Figure 7:
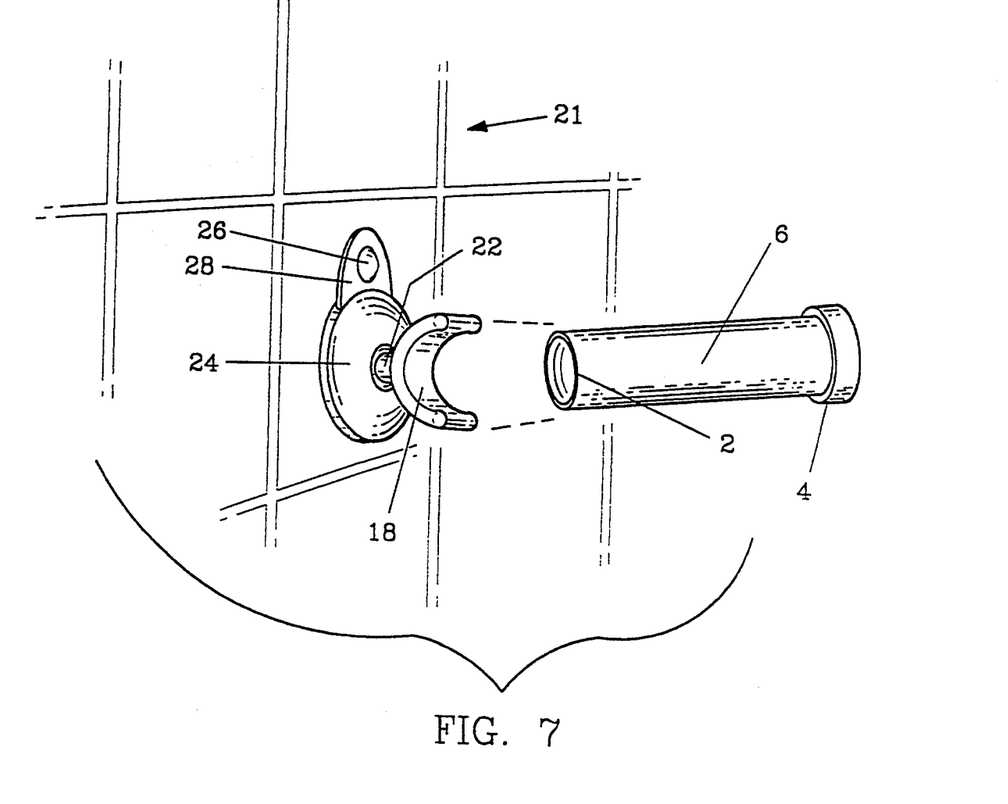
FIG. 7 is a perspective view illustrating the manner of attachment of components of this invention to a bathtub wall.

FIGS. 6 and 7 illustrate how the components and overall assembled toy are attached to the vertical surface, in this case a bathtub wall 21 by means of suction cups 24. Suction cup 24 is attached by a connector 20 to a U-shaped clamp 18. Preferably the connector 20 is free to swivel or turn in a base 22. A handle 28, with a finger nib 26 to enhance one's grip on the handle 28, is preferably provided to permit flexing the suction cup 24 and facilitate its release from the wall 21. The conduit 6 (or other component), is held into clamp 18 by an interference fit. As mentioned above, the interference fit must be sufficiently tight to hold the component securely but yet be readily released for change or disassembly of the toy. If desired, the ends 16 of the clamp 18 may be rounded to enhance the grip on the conduit and to minimize any potential for injury of the user.

Figure 21:
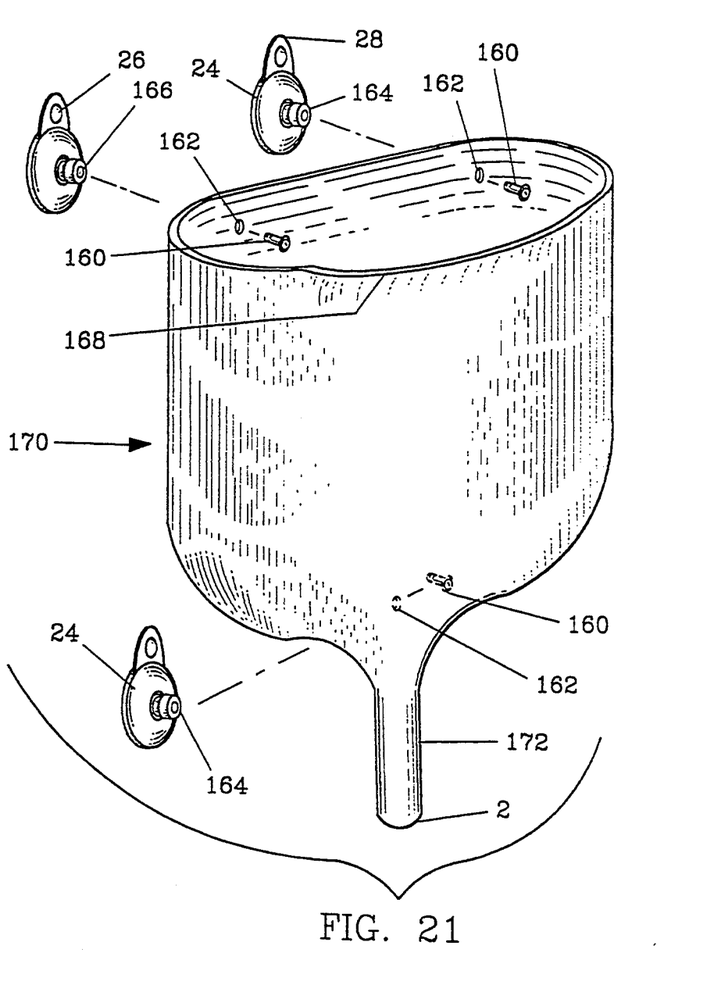
FIG. 21 is a perspective view of a reservoir.

FIG. 21 illustrates the water reservoir 170, which commonly has an oval shaped top 168, with the longer dimension resting against the bathtub wall 21. The reservoir funnels into an outlet tube 172 which typically ends in male coupler 2. The reservoir 170 is attached to the suction cups 24 by means of screws or pins 160 which pass through holes 162 in the reservoir wall and are seated in sockets 166 in the bases 164 attached to suction cups 24. This attachment of the reservoir 170 to the suction cups 24 may be semi-permanent, since they do not need to be separated other than for cleaning or replacement of non-functional suction cups. The reservoir 170 may have any convenient volume, although normally the volume will be relatively small, so that the weight of the contained water will not be so great as to tend to pull the reservoir away from the wall.

Figure 10:
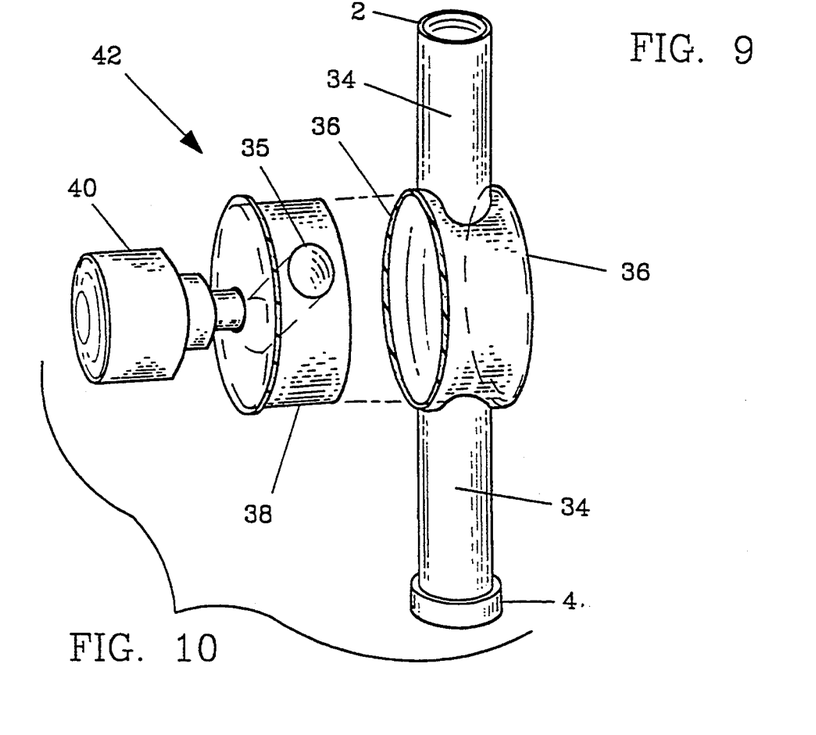
FIG. 10 is an exploded view of a stopcock member.

FIG. 10 illustrates a stopcock valve 42 which consists of a tubular conduit 34 into which a hollow casing 36 is inserted. A cylindrical plug 38 which has a hole 35 therethrough fits into the casing 36 such that the bore of conduit 34 and hole 35 can be aligned. Rotation of the plug 38 by means of knob 40 permits the hole 35 and the bore of conduit 34 to be brought into or out of alignment to control or halt the water flow. A particularly convenient location for one stopcock is at the end of the outlet 172 of the reservoir 170, so that the initial water flow from the reservoir can be stopped until the desired quantity of water has accumulated in the reservoir, and then the rate of release of water from the reservoir 170 can be controlled by the stopcock.

There are a wide variety of activity members or components, each of which is intended to provide a different point of interest for the child, and to operate in a different manner. It will be understood that not all of the different activity components need be used at the same time, or that all activity components will necessarily be suitable for all ages of children.

Figure 11:
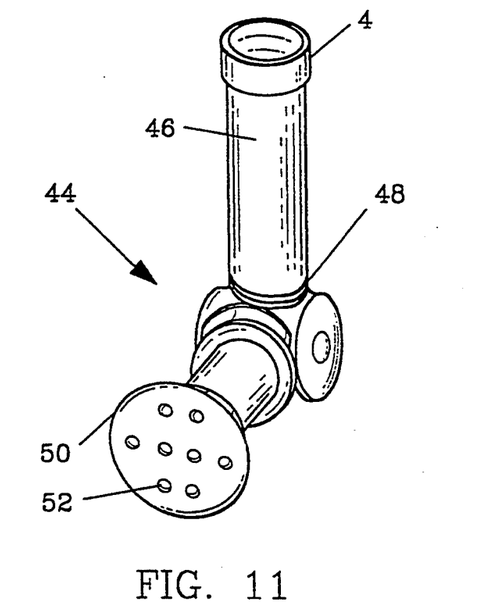
FIG. 11 is a perspective view of a sprayer with the spray head in place.
Figure 12:
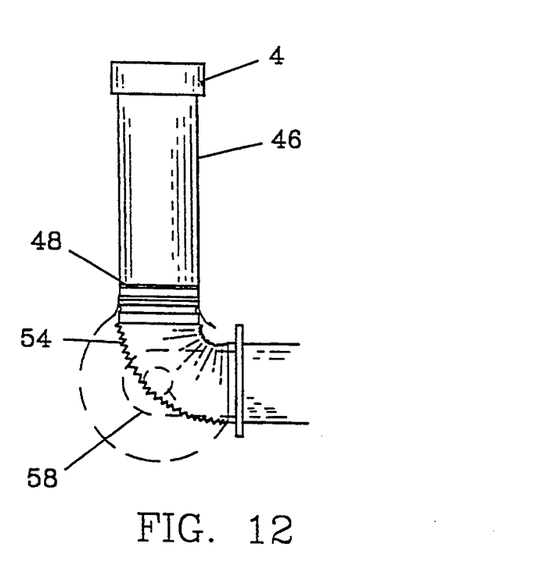
FIG. 12 is a side elevation view of another embodiment of the sprayer of FIG. 11, illustrating the inclusion of a flexible elbow joint.
Figure 13:
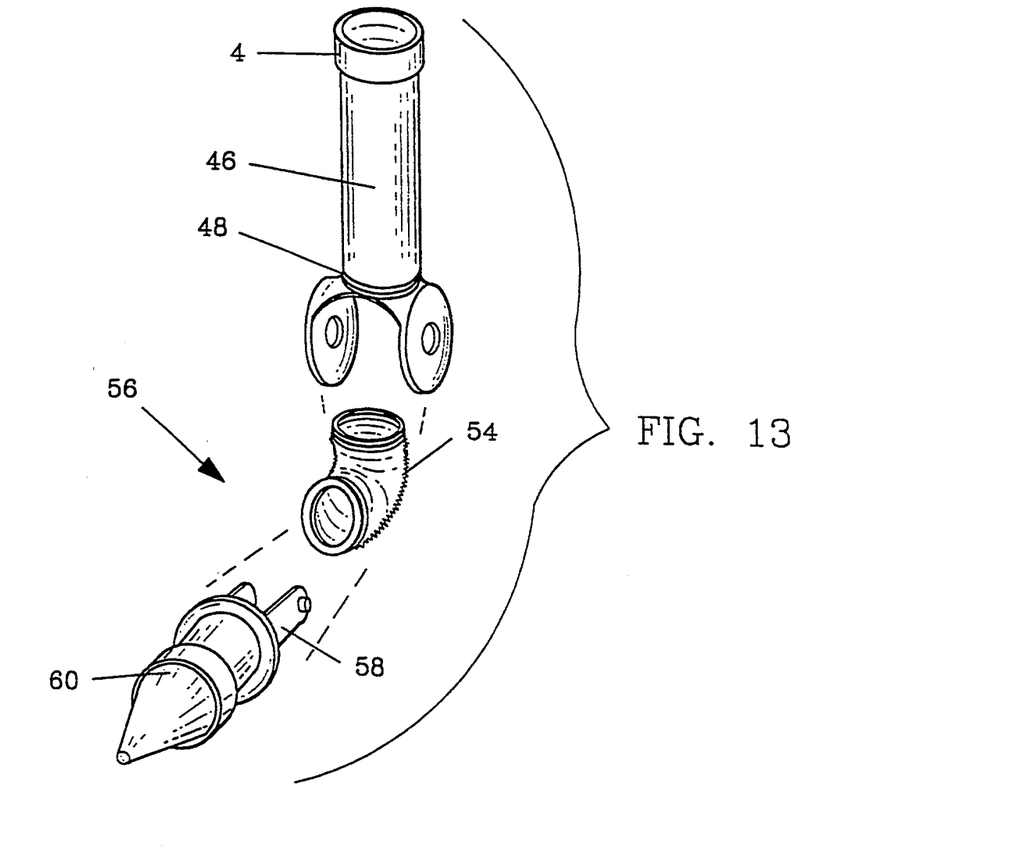
FIG. 13 is an exploded view of another embodiment of the sprayer of FIG. 11, illustrating the use with a squirter member.

FIGS. 11, 12 and 13 show the water sprayer 44 or squirter 56. These two components are substantially identical, except that the sprayer 44 has a spray head 50 and the squirter 56 has a nozzle 60. Water flowing through the spray head 50 is emitted in a fine or coarse spray (depending on the size and number of the holes 52) while water passing through the squirter's nozzle 60 is emitted as a narrow stream under light pressure. There is an inlet tube 46 which is connected to a swivelling elbow 48 and/or a flexible elbow 54, which in turn is connected to the spray head 50 or nozzle 60, and which permits the spray head 50 or nozzle 64 to move in two or three dimensions. Preferably the component will have attachment means 58 so that the spray head 50 and the nozzle 60 can be interchangeable, to increase the play value of the toy.

Figure 14:
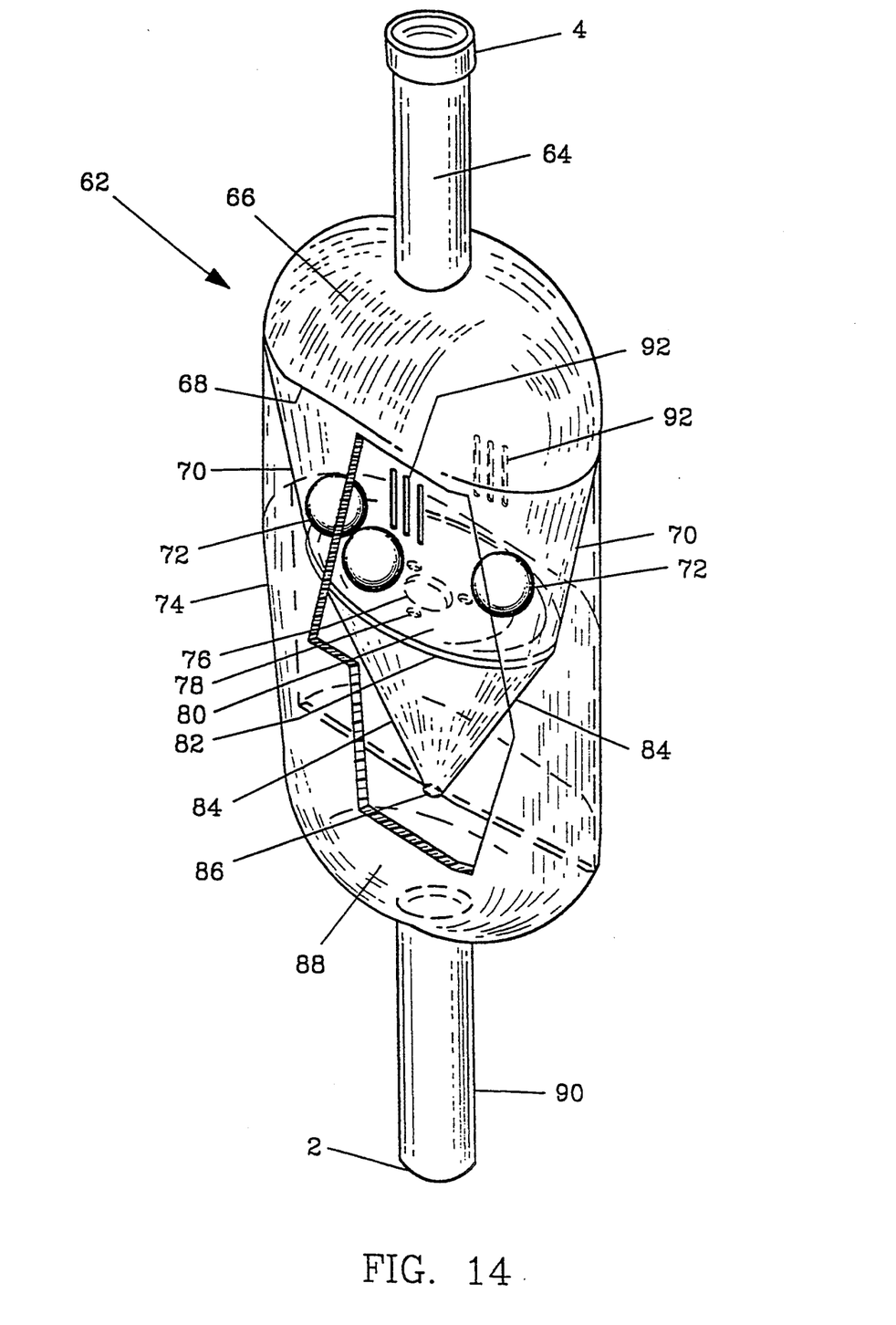
FIG. 14 is a perspective view, partially cut away, of an hour glass member.

FIG. 14 shows the hourglass 62, which consists of an upper inner chamber 70, a lower inner chamber 84 and an outer shell 74. The two inner chambers are joined at 82, and the outer shell is joined to the top of upper inner chamber 70 at 68, so that the two inner chambers 70 and 84 are disposed inside shell 74, creating a catch basin 88 at the bottom of shell 74. All of the parts are transparent. Inside the inner chamber 70 are several buoyant balls 72, which preferably are of different colors. With no water in the hourglass, the balls rest on plate 80, which is perforated by a large drain hole 76 and several small drain holes 78, which open into lower chamber 84. One of the balls 72 rests on and plugs large drain hole 76. Lower inner chamber 84 is funnel shaped and terminates in small drain hole 86, which opens into catch basin 88. Catch basin 88 itself drains through conduit 90 to the exterior of the hourglass 62. When water is flowed into hourglass 62 through conduit 64 attached to top 66, the water begins to accumulate in upper chamber 70, causing all of the balls to float except the one plugging hole 76. However, some water flows through the small holes 78 and gradually fills lower chamber 84 eventually causing the remaining ball 72 to float and open hole 76. Excess water overflows through grates 92 in the side of chamber 70. Eventually all of the water drains into the catch basin 88 and out through conduit 90.

Figures 15, 25:
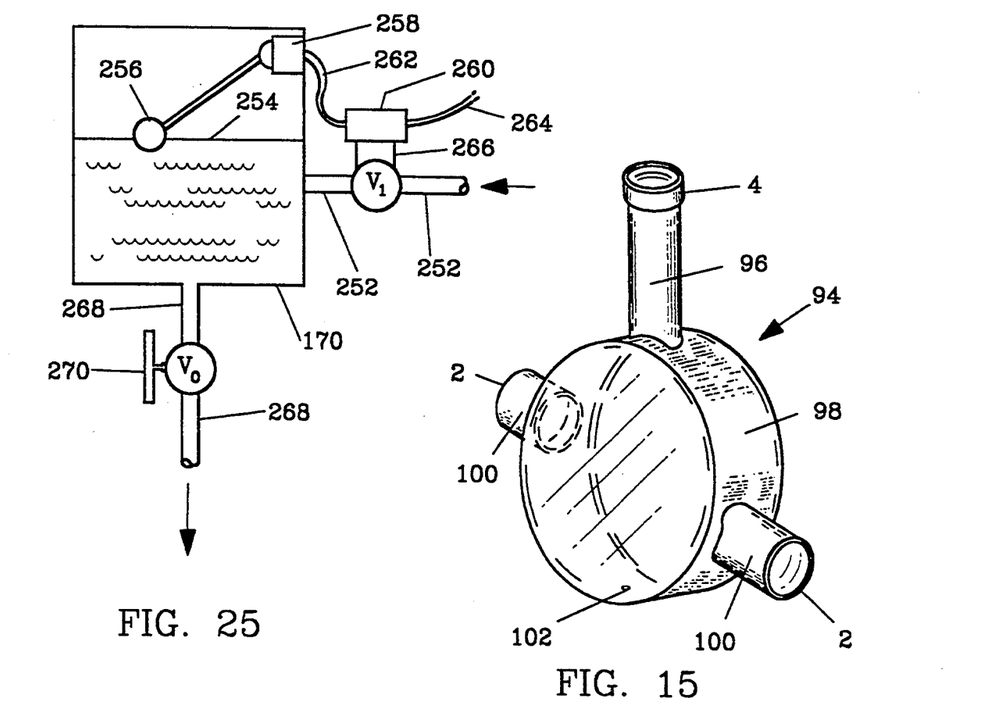
FIG. 15 is a perspective view of a beaker member.
FIG. 25 is a schematic representation of a demand or feedback system for providing water on demand to the toy.

FIG. 15 shows a beaker or water divider 94 which consists of a drum 98, inlet tube 96 and outlet tubes 100. Water entering the beaker 94 separates into two or more streams (depending on the number of outlet tubes 100) and the remaining water drains out of the beaker through hole 102.

Figure 16:
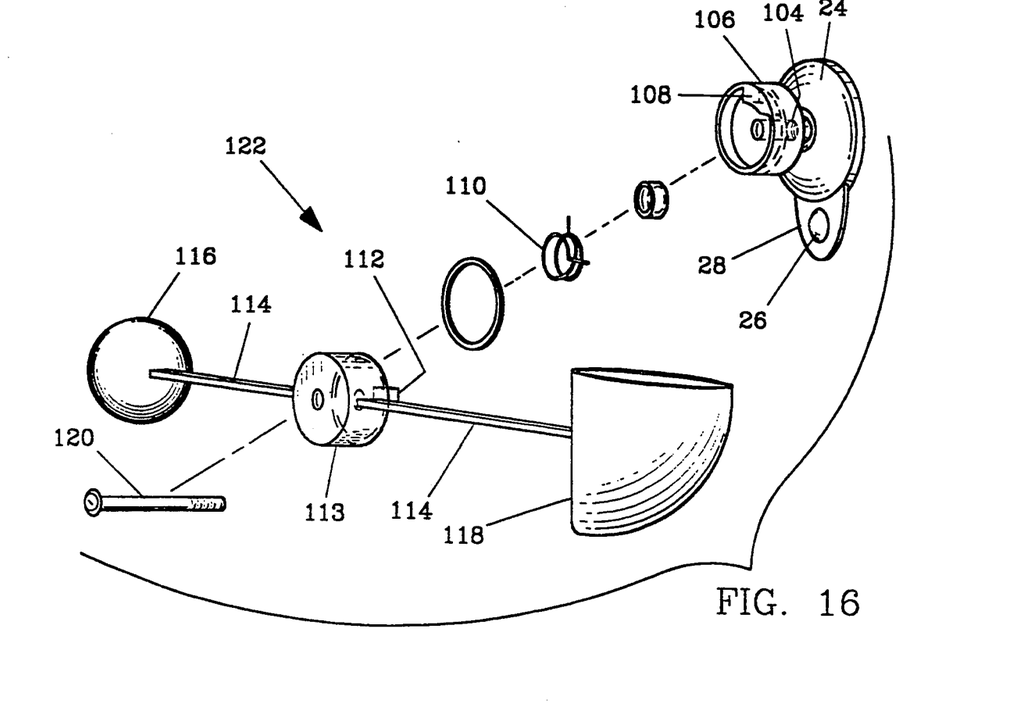
FIG. 16 is an exploded view of a dipper member.

FIG. 16 shows a rotating dipper 122, which attaches to the vertical surface by means of a suction cup 24 with a hollow rotatable drum 106, which pivots on bolt 120 which mounts through a central hole in hub 113 KM 7-21-93 and is seated in socket 104. The rotating dipper 122 consists of a water pendulum arm 114, one end of which has a water receptacle 118 and the other end has a counterweight 116. Before the water fills receptacle 118, the counterweight 116 is heavier than the empty receptacle 118, so that the dipper will tend to swing downward on the counterweight side. A spring 110 assists counterweight 116 to return arm 114 to a horizontal position after water is dumped from receptacle 118. Block 112 rests against block 108 and prevents the arm 114 from swinging to the vertical position. Water pouring into the receptacle 118 (as from a conduit above, as shown in FIG. 1) provides additional weight to the receptacle until the combined weight of the water and receptacle exceeds that of the counterweight 116, causing the dipper to rotate, spilling the water and returning to the original position.

Figure 17:
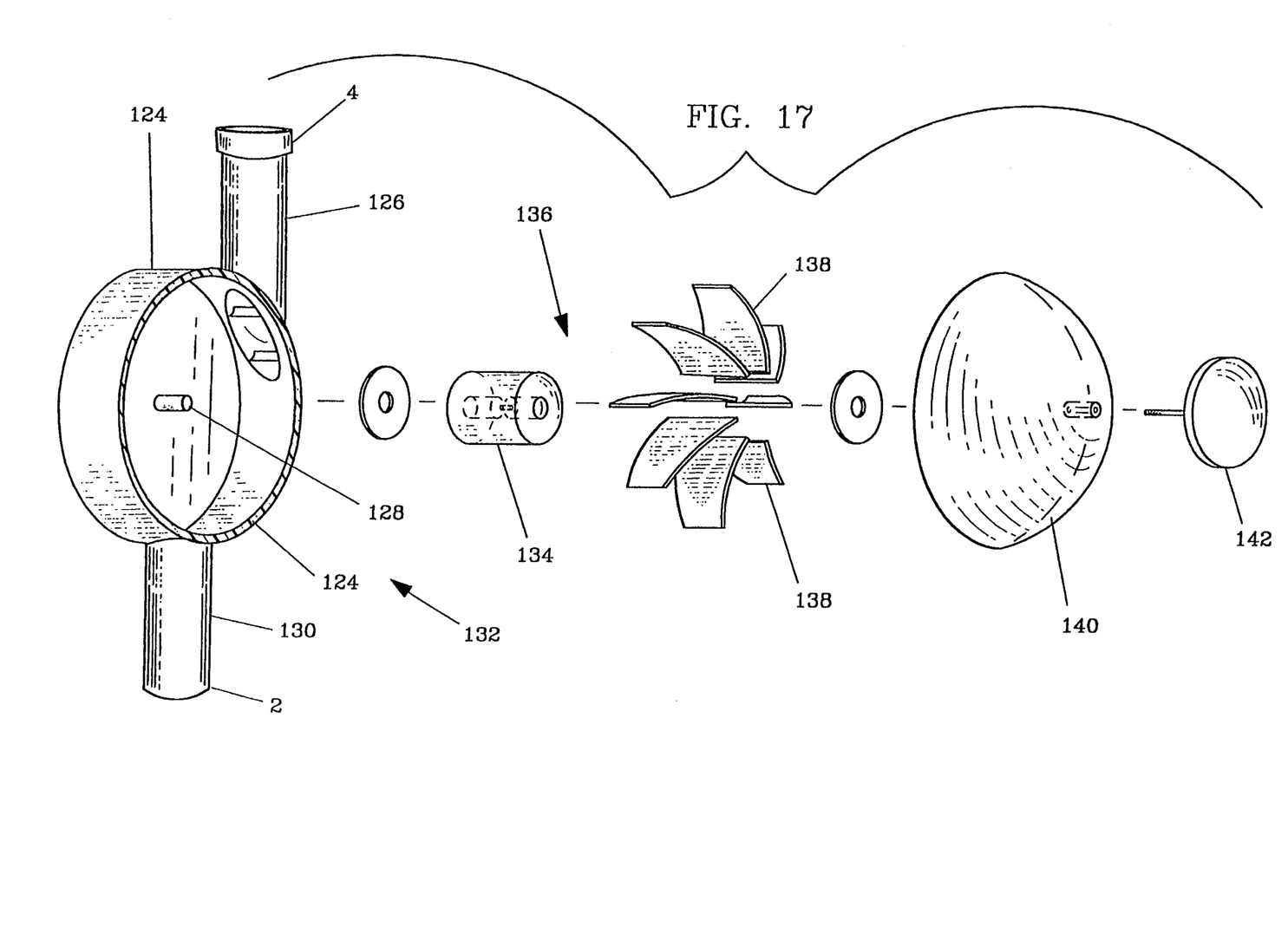
FIG. 17 is an exploded view of a water turbine.
Figure 18:
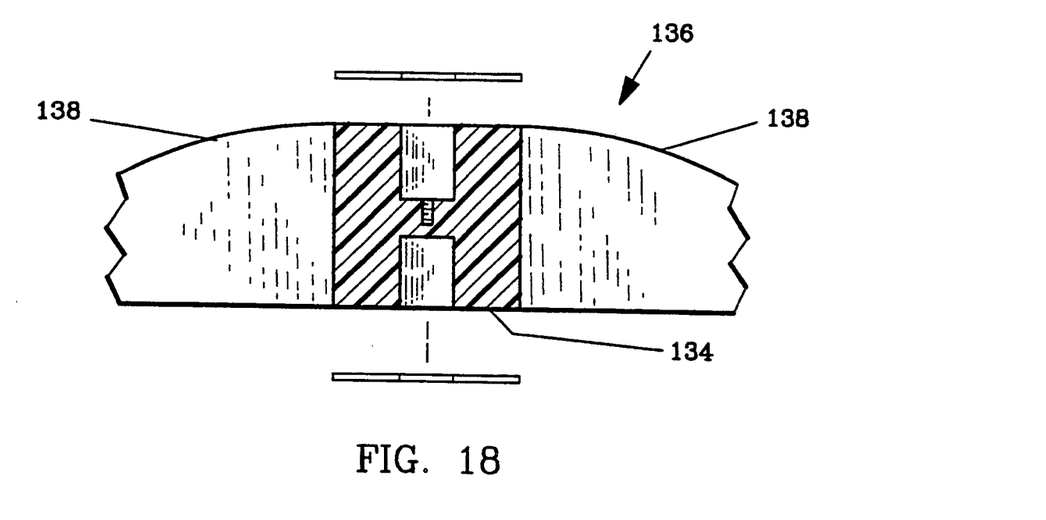
FIG. 18 is a side elevation view, partially in section, illustrative the manner of assembly of the components of the water turbine of FIG. 17.

FIGS. 17 and 18 show a water turbine 132. The water turbine consists of a hollow casing 124 which has an inlet tube 126 and an outlet tube 130. The inlet tube 126 and outlet tube 130 are offset from the center of the casing 124. Inside the casing 124 is a turbine blade wheel 136 which consists of a hub 134 on which a plurality of peripheral blades 138 are mounted and which is mounted for rotation on axle 128. The casing 124 is covered by transparent dome 140 and face disk 142 so that operation of the turbine can be observed. Water entering through inlet tube 126 hits the turbine blades 138 at an angle, causing the turbine wheel 136 to rotate, carrying the water with it. The face disk 142 is attached to hub 134 and thus also rotates with turbine wheel 136. A design or picture may be placed on face disk 142 to increase the visual stimulation to the user. As the wheel 136 turns, the water eventually passes reaches outlet conduit 130 and exits from the turbine.

Figure 19:
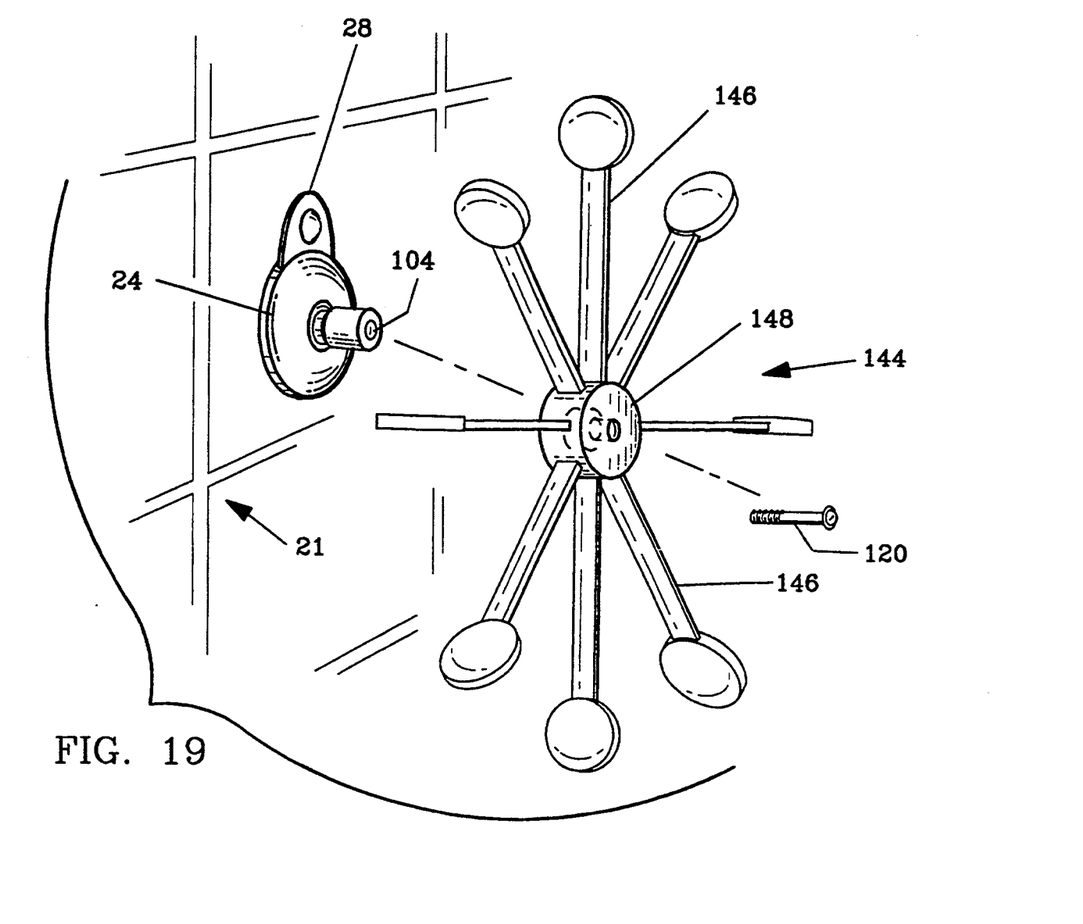
FIG. 19 is a perspective exploded view illustrating a paddle wheel member and its manner of attachment to a bathtub wall.

FIG. 19 shows a paddle wheel 144, which operates like an external turbine. The water wheel is mounted on a suction cup 24 which has a socket 104 to receive an axle 120 on which the hub 148 is rotationally mounted. A plurality of paddle arms 146 extend outwardly from hub 148. When water falls on the ends of some of the paddle arms 146 KM 2-21-93 (as illustrated in FIG. 1), the paddle wheel rotates.

Figure 20:
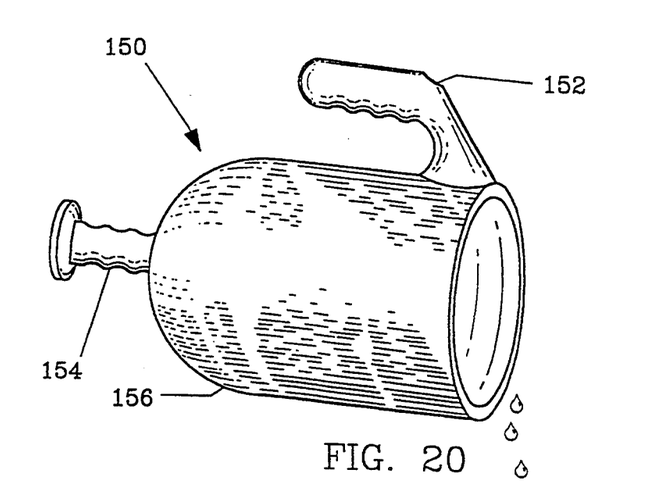
FIG. 20 is a perspective view of a water scoop.

Scooper 150 is illustrated in FIG. 20. It will typically have a handle 152 attached to bowl 156. A second grip 154 can be present to enable a child to hold it better. Both the handle 152 and grip 154 may have formed ribs for finger gripping as shown.

Figure 22:
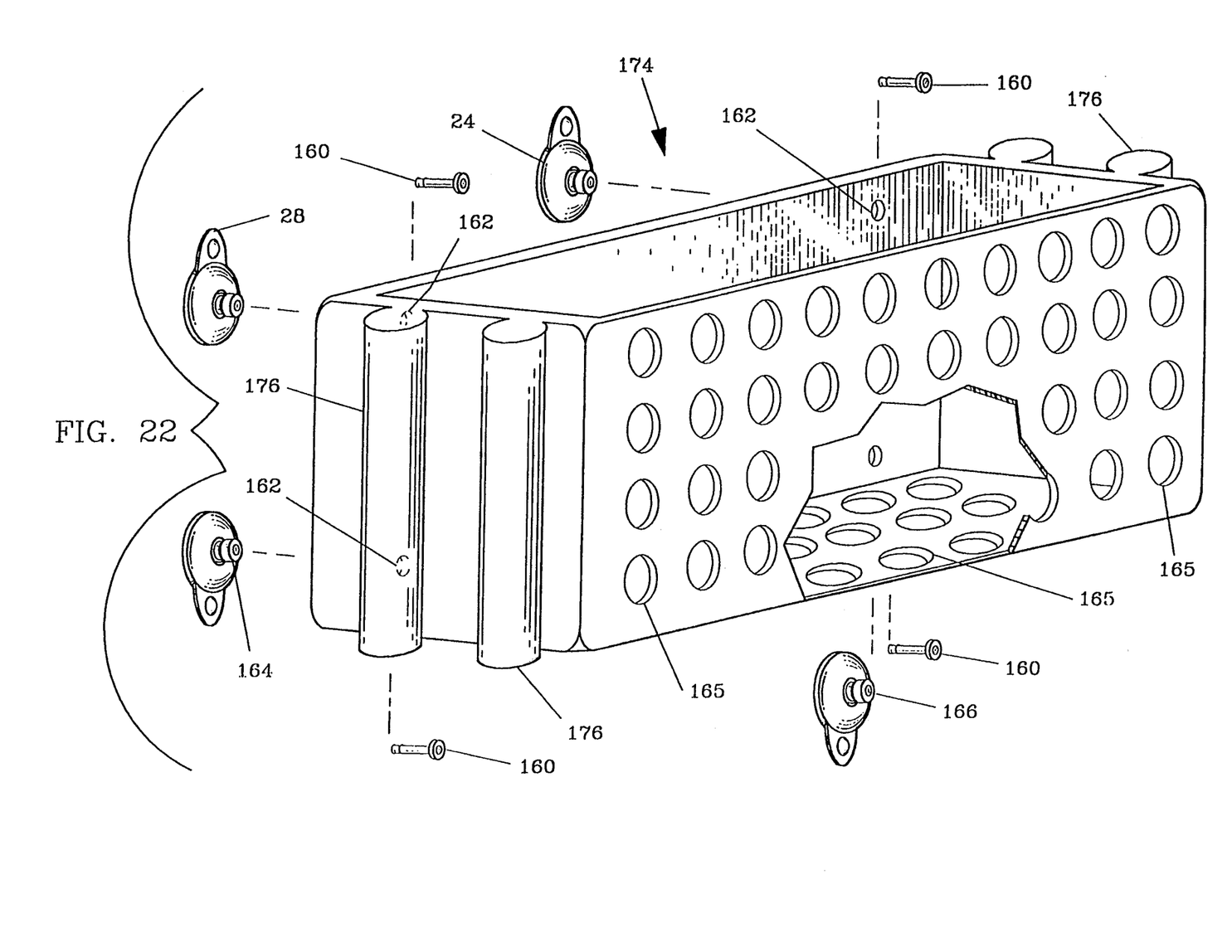
FIG. 22 is an exploded view of a holding basket for the components of the toy and illustrating a manner of attaching the basket to a bathtub wall.

To provide for storage of the various parts when they are not in use, it is convenient to have basket 174. Basket 174 can be semi-permanently attached to suction cups 24, in the same manner as described above for reservoir 170, so that it can be attached to the wall 21. When the toy is disassembled, the various parts can be placed in basket 170. (The number and size of the suction cups 24 must be sufficient to hold the full basket 174 attached to the wall 21.) Preferably the walls and bottom of basket 170 will be perforated with various holes 165 to prevent water from collecting in the basket. The basket may be formed with attached rods 176 onto which the U-shaped clamps 18 (and their attached suction cups 24) may be placed for storage, leaving the interior of the basket 170 open for storage of the larger activation components and conduits.

The foregoing describes an educational, construction toy suitable for bathtub use. It consists of a variety of interlocking pieces, which either allow water to pass through them, or which control, or respond to, water flow. In addition, there are easily-removable suction cup pieces which attach to the bathtub wall and which permit the other elements to be supported by the bathtub wall.

FIG. 24 illustrates use of the toy as an outside toy. A vertical panel 190 (which is braced in position by leg 192) is used to mount the toy, as by suction cups 24 with handles 28. The reservoir 198 is attached to hose 188 by a common hose coupling structure 200/202. This Figure also illustrates a embodiment in which the various conduits and action figures are made in fanciful shapes, such as animals, cartoon characters, mythical or whimsical beasts or characters, buildings, vehicles, abstract shapes and the like, to enhance the entertainment value of the toy. Exemplified are a conduit 194 in an animal shape and a sprayer 196 in the shape of a whimsical character. Many other pleasant and amusing shapes for the various parts will quickly come to mind, and all are intended to be within the scope of this invention.

While the preferred embodiments of the present invention have been shown and described herein, it will be obvious that such embodiments are provided by way of example only. Numerous variations, changes and substitutions will occur to those skilled in the art without departing from the invention herein. Accordingly, it is intended that the invention be limited only by the spirit and scope of the appended claims.

I claim:

1. A fluid-conveying and -operated toy comprising
a fluid reservoir for a flowable fluid having an inlet and an outlet;
at least one elongated fluid conduit member having an inlet and an outlet and which provides fluid flow communication of said fluid from said reservoir to an activity member;
at least one said activity member disposed adjacent to said outlet of said fluid conduit member and which is placed into motion by being contacted with said fluid;
coupling means for connecting said inlet of said conduit member to said outlet of said reservoir to provide a fluid flow path for said fluid communication of said flowing fluid from said reservoir into and through said conduit member and then to said activity member; and
attaching means for removably attaching each of said reservoir, conduit member and activity member to a generally flat vertical surface in an orientation such that said fluid flows along said fluid flow path under the force of gravity.

2. A toy as in claim 1 wherein said activity member is selected from the group consisting of a paddle wheel, a turbine, an hourglass member, a dipper, a sprayer and a squirter.

3. A toy as in claim 1 further comprising at least one regulating means cooperating with said conduit to control the rate of flow of said fluid through said conduit.

4. A toy as in claim 3 wherein said regulating means comprises a stopcock.

5. A toy as in claim 1 wherein said coupling means comprises male and female ends respectively on abutting members and each pair of said members is coupled by interfitting of said respective male and female ends.

6. A toy as in claim 1 wherein said conduit member includes straight and curved conduits.

7. A toy as in claim 6 wherein said curved conduits include curved members of a fixed degree of curvature and flexible curved members.

8. A toy as in claim 1 further comprising at least one fluid stream separation member with an inlet and a plurality of outlets, and in which fluid entering said member through said inlet is divided into a plurality of flow streams, each of which exits from said member through a different one of said outlets.

9. A toy as in claim 1 wherein said attachment means comprises suction cups to grip said vertical surface and, attached to said cups, fastening means to secure thereto said conduit member, activity member and said reservoir, 10. A toy as in claim 1 wherein all of said reservoir, conduit member and activity member are formed of transparent material.

11. A toy as in claim 10 wherein said transparent material is a plastic.

12. A toy as in claim 1 wherein said reservoir is capable of being filled with fluid by manual means.

13. A toy as in claim 12 wherein said manual filling occurs intermittently.

14. A toy as in claim 12 wherein said manual filling occurs continuously.

15. A toy as in claim 12 wherein said manual means comprises a scoop.

16. A toy as in claim 1 further containing control means for providing fluid to said reservoir on a demand basis.

17. A toy as in claim 16 wherein said control means comprises a fluid supply conduit to said reservoir, valve means in said conduit to control the flow of fluid therethrough, sensor means for sensing fluid level in said reservoir and generating a signal indicative of said level, and controller means for receiving said signal and in response thereto operating said valve means to control said fluid flow to said reservoir.

* * * * *

UNITED STATES PATENT AND TRADEMARK OFFICE
CERTIFICATE OF CORRECTION

PATENT NO. : 5,385,472
DATED : JANUARY 31, 1995
INVENTOR(S) : KEITH A. MULLIN

It is certified that error appears in the above-indentified patent and that said Letters Patent is hereby corrected as shown below:

ON THE TITLE PAGE ITEM [76], DELETE "2797 NORTHBROOK PL., BOULDER, COLO. 80304" AND INSERT --7758 LUDINGTON PLACE, LA JOLLA, CALIFORNIA 92037--.

Signed and Sealed this

Twenty-fifth Day of April, 1995

Attest:

BRUCE LEHMAN

*Attesting Officer*      *Commissioner of Patents and Trademarks*